No. 779,014. PATENTED JAN. 3, 1905.
G. P. WALLIS & G. FOX.
BRICK MAKING MACHINERY.
APPLICATION FILED NOV. 30, 1903.

5 SHEETS—SHEET 1.

No. 779,014. PATENTED JAN. 3, 1905.
G. P. WALLIS & G. FOX.
BRICK MAKING MACHINERY.
APPLICATION FILED NOV. 30, 1903.

5 SHEETS—SHEET 2.

No. 779,014. PATENTED JAN. 3, 1905.
G. P. WALLIS & G. FOX.
BRICK MAKING MACHINERY.
APPLICATION FILED NOV. 30, 1903.

5 SHEETS—SHEET 4.

Witnesses:—
Benjamin Clark.
Charles H. Briggs.

Inventors:—
George Pearson Wallis, and
George Fox.
per: E. Eaton.
Their Attorney.

No. 779,014. PATENTED JAN. 3, 1905.
G. P. WALLIS & G. FOX.
BRICK MAKING MACHINERY.
APPLICATION FILED NOV. 30, 1903.

5 SHEETS—SHEET 5.

Witnesses:—
Benjamin Black
Charles H. Briggs

Inventors:
George Pearson Wallis, and
George Fox.
per: E. Eaton
Their Attorney.

No. 779,014.

Patented January 3, 1905.

UNITED STATES PATENT OFFICE.

GEORGE PEARSON WALLIS, OF LEEDS, AND GEORGE FOX, OF LONDON, ENGLAND.

BRICK-MAKING MACHINERY.

SPECIFICATION forming part of Letters Patent No. 779,014, dated January 3, 1905.

Application filed November 30, 1903. Serial No. 183,311.

*To all whom it may concern:*

Be it known that we, GEORGE PEARSON WALLIS, a resident of Leeds, in the county of York, and GEORGE FOX, a resident of London, in the county of Middlesex, England, subjects of the King of Great Britain, have invented certain new and useful Improvements in Brick-Making Machinery, (for which we have applied for a patent in Great Britain, No. 18,918, dated September 2, 1903,) of which the following is a full, clear, and exact specification.

This invention relates to improvements in apparatus for the manufacture of bricks from sand, lime, and other material. By this improved process $CO_2$ gas is impregnated into the mixture of materials while being prepared for the molding and stamping machinery, also the treatment of the bricks when molded by $CO_2$ gas. We have found that by this admixture of $CO_2$ with the ingredients before molding and the treatment after molding a much harder brick is produced at much less cost than by the processes hitherto employed.

Figure 1:
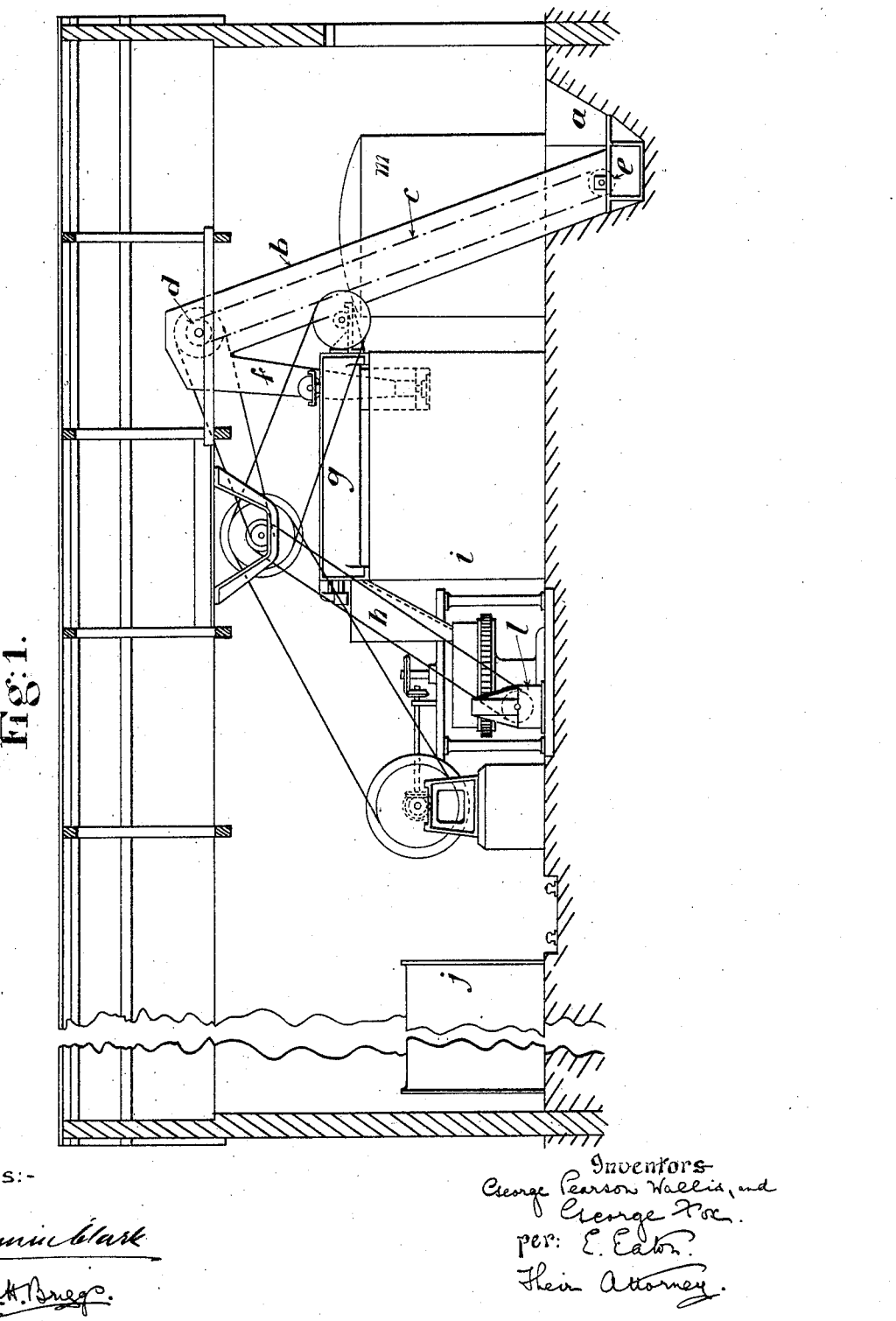
Figure 2:
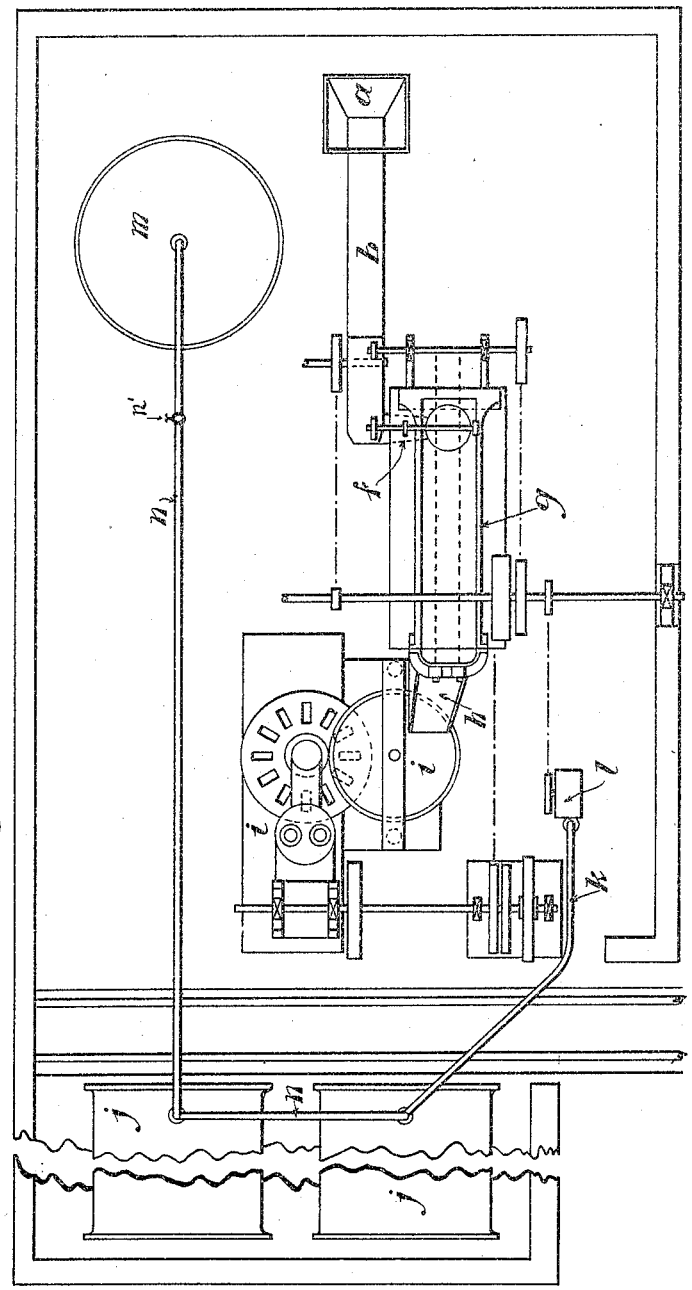
Figure 3:
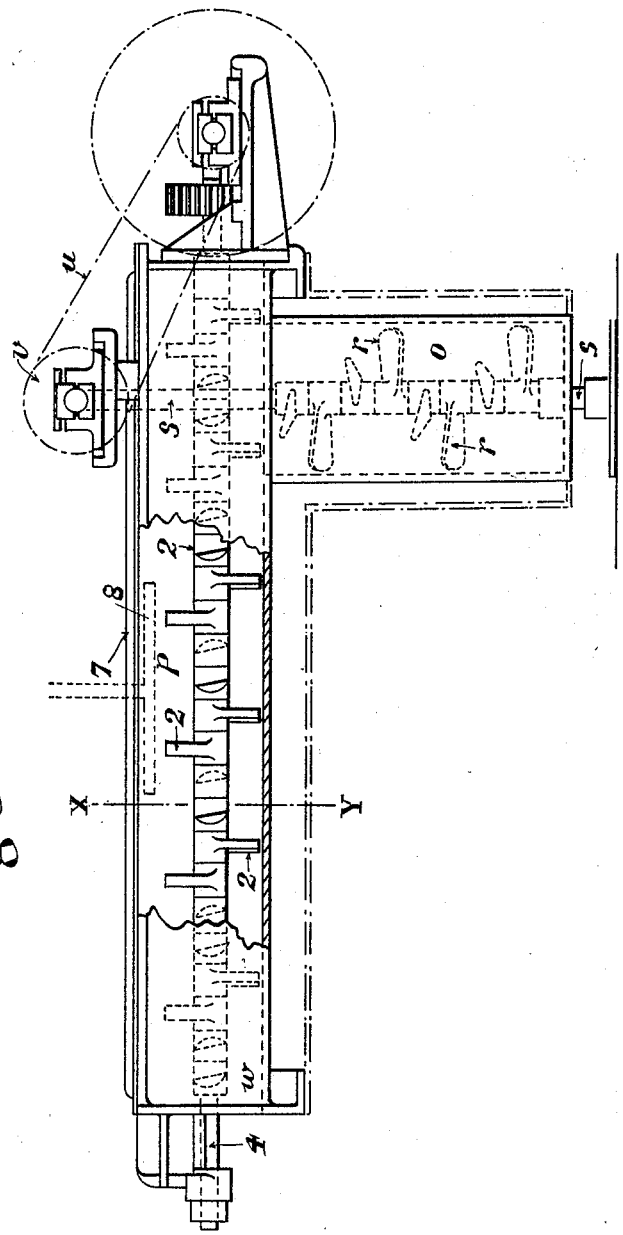
Figure 4:
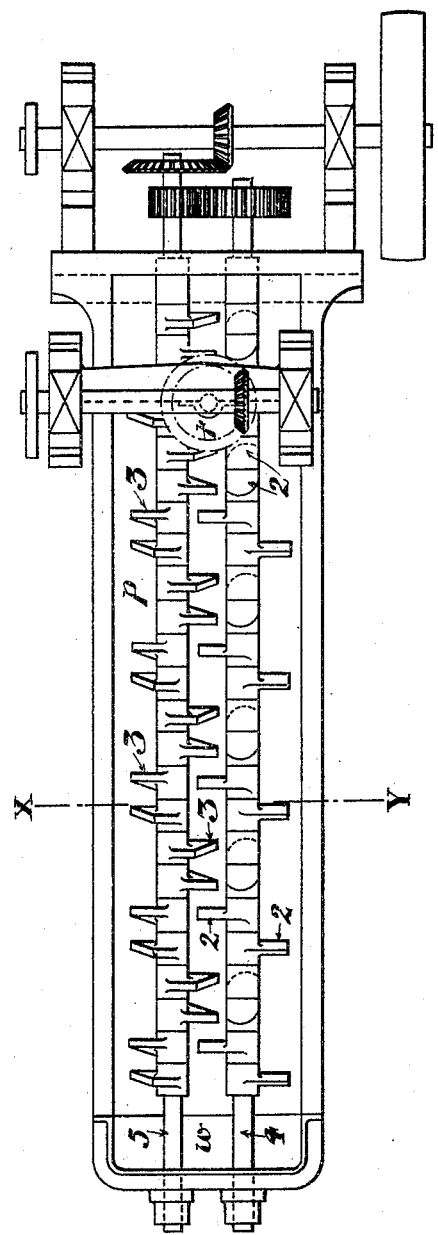
Figure 5:
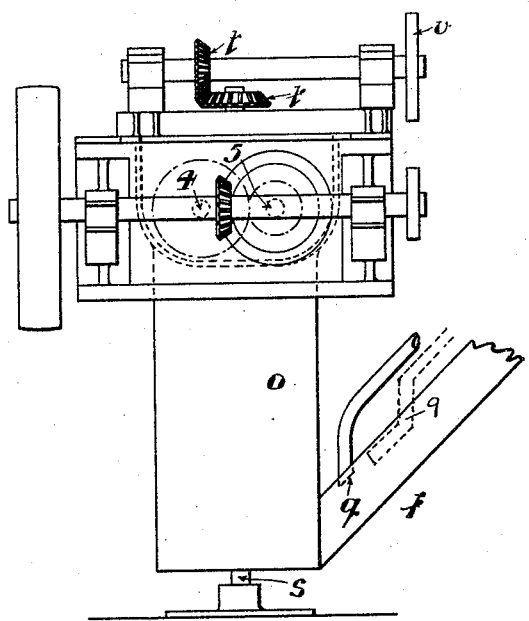
Figure 6:
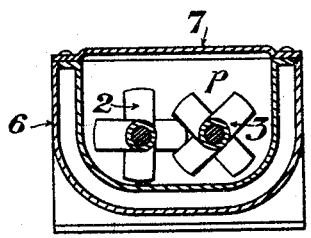

Referring to the annexed drawings, Figure 1 is a sectional side elevation showing the general arrangement of our improved plant; Fig. 2, a plan view of same; Fig. 3, a side elevation of our improved form of mixer, partly in section; Fig. 4, a plan view of same, the cover being removed for purposes of clearness; Fig. 5, an end elevation; Fig. 6, a section through line X Y, Figs. 3 and 4, showing the mixer having a steam or hot-water jacket in combination therewith.

Referring to Fig. 1, the materials of which the bricks are to be made are first mixed in the desired proportions and placed in the hopper $a$ and are conveyed therefrom by means of the elevator $b$, which is preferably of the dredger type, having the endless band $c$ traveling over the pulleys $d$ and $e$. The material is delivered from the top of this elevator down the chute $f$ to the mixer $g$, the ingredients being thoroughly intermixed with the mixer and passing through the end thereof through the chute $h$ on to the brick-making plant $i$. This latter may be of any suitable and well-known form and is not part of this present invention. The bricks after being molded are taken from the plant and placed into the chambers $j$, from which the air is exhausted by means of the pipe $h$ and pump $l$. The chambers are then charged with the desired quantity of $CO_2$ from the chamber $m$ through the medium of the pipes $n$. The bricks are then allowed to remain in the hardening-chambers the desired period of time, when the remaining $CO_2$ is exhausted and the bricks removed. We introduce, if necessary, into the pipes $n$ a suitable cock or valve $n'$ for regulating the supply of $CO_2$ in the chambers.

Referring to Figs. 3, 4, and 5, our improved mixer is formed in two portions, the vertical and horizontal, $p$, being secured together, as shown, and provided with steam-jackets, (represented by the dotted lines, Fig. 3,) if desired. The mixed materials are delivered into the bottom of the vertical part of the mixer through chute $f$, which has an aperture $q$, through which $CO_2$ is passed. The mixture is raised within the vertical part of the mixer $g$ by means of the blades $r$, which are operated by the revolving spindle $s$ from the bevel-wheels $t$, which are operated from any suitable source of power through the medium of the belt $u$ and pulley $v$. As the mixture ascends this vertical portion of the mixer it is thoroughly impregnated with the $CO_2$, admitted through the aperture $q$, the mixture being delivered into the horizontal portion $p$, where it is thoroughly mixed by the blades 2 and 3, carried by the shafts 4 and 5, respectively, which are so geared as to revolve at differential speeds and which also causes the substance to travel to the end $w$ of the mixer, whence it is delivered, through the chute $h$, Fig. 2, to the brick-making machine.

Referring to Fig. 6, in this view is shown an alternative form of mixer which we employ, if desired, 6 being a steam or water jacket for the purpose of heating the horizontal mixer $p$ for the further and more complete slaking of the lime, should this be desirable, the lime of course being thoroughly slaked before admixed with the other ingredients.

The mixer is provided with a suitable cover 7, being preferably bolted to the body of the mixer. If desired, a suitable inlet 8 may be provided within the horizontal portion $p$ of the mixer, so that steam or hot air may be admitted and intermixed with the material contained therein. A perforated pipe 9 may also be placed near to the aperture $q$, so that hot water may be mixed with the $CO_2$ gas and materials, if desired.

Having thus described our invention, what we claim, and desire to secure by Letters Patent, is—

1. In means for the manufacture of sand-and-lime bricks in combination, a compound horizontal and vertical mixer, a vertical spindle through the center of vertical portion of said compound mixer, horizontal knives or elevators attached to said vertical spindle, a pair of horizontal spindles through the center of the horizontal portion of mixer, said horizontal spindles rotating at differential speeds, knives or blades attached to said horizontal spindles, a steam or hot-water jacket surrounding said compound mixer, a chute at the end of said horizontal portion of mixer, substantially as described and illustrated herein.

2. In means for the manufacture of sand-and-lime bricks in combination, a compound horizontal and vertical mixer, a vertical spindle through the center of vertical portion of said compound mixer, horizontal knives or elevators attached to said vertical spindle, a pair of horizontal spindles through the center of the horizontal portion of mixer, said horizontal spindles rotating at differential speeds, knives or blades attached to said horizontal spindles, a steam or hot-water jacket surrounding said compound mixer, a chute at the end of said horizontal portion of mixer, an elevator for conveying the material above said mixer, a chute for said elevator delivering said mixture to the bottom of the vertical portion of the compound mixer, an aperture at the junction of said chute with said vertical mixer for the admission of $CO_2$ gas which impregnates the brick material as it ascends the vertical mixer, substantially as described and illustrated herein.

3. In means for the manufacture of sand-and-lime bricks in combination, a compound horizontal and vertical mixer, a vertical spindle through the center of vertical portion of said compound mixer, horizontal knives or elevators attached to said vertical spindle, a pair of horizontal spindles through the center of the horizontal portion of mixer, said horizontal spindles rotating at differential speeds, knives or blades attached to said horizontal spindles, a steam or hot-water jacket surrounding said compound mixer, a chute at the end of said horizontal portion of mixer, an elevator for conveying the material above said mixer, a chute for said elevator delivering said mixture to the bottom of the vertical portion of the compound mixer, an aperture at the junction of said chute with said vertical mixer for the admission of $CO_2$ gas which impregnates the brick material as it ascends the vertical mixer, hardening-chambers into which bricks are placed, $CO_2$ gas being then admitted into the hardening-chambers, an air-pump connected to said hardening-chambers for the exhaustion of the air previous to insertion of bricks, substantially as described and illustrated herein.

In testimony that we claim the foregoing we have hereunto set our hands this 7th day of August, 1903.

GEORGE PEARSON WALLIS.
GEORGE FOX.

Witnesses to the signing hereof by George Pearson Wallis:
GEORGE WM. TYBUS,
WILLIAM J. MORRIS.

Witnesses as to the signature of George Fox:
WILLIAM JOHN WEEKS,
RICHARD BUNDY.